United States Patent
Saft et al.

(10) Patent No.: US 11,301,634 B2
(45) Date of Patent: Apr. 12, 2022

(54) SYSTEM AND METHOD THEREOF FOR DETERMINING VENDOR'S IDENTITY BASED ON NETWORK ANALYSIS METHODOLOGY

(71) Applicant: Vatbox, Ltd., Herzeliya (IL)

(72) Inventors: Isaac Saft, Kfar Neter (IL); David Guedalia, Bet Shemesh (IL); Yury Gubman, Jerusalem (IL)

(73) Assignee: Vatbox, Ltd., Herzeliya (IL)

( * ) Notice: Subject to any disclaimer, the term of this patent is extended or adjusted under 35 U.S.C. 154(b) by 197 days.

(21) Appl. No.: 16/827,419

(22) Filed: Mar. 23, 2020

(65) Prior Publication Data

US 2020/0302119 A1 Sep. 24, 2020

Related U.S. Application Data

(60) Provisional application No. 62/925,100, filed on Oct. 23, 2019, provisional application No. 62/861,075, filed on Jun. 13, 2019, provisional application No. 62/822,484, filed on Mar. 22, 2019, provisional application No. 62/822,481, filed on Mar. 22, 2019, provisional application No. 62/822,478, filed on Mar. 22, 2019.

(51) Int. Cl.
*G06F 40/295* (2020.01)
*G06K 9/00* (2022.01)
*G06F 16/901* (2019.01)
*G06Q 40/00* (2012.01)

(52) U.S. Cl.
CPC ........ *G06F 40/295* (2020.01); *G06F 16/9024* (2019.01); *G06K 9/00456* (2013.01); *G06K 9/00483* (2013.01); *G06Q 40/123* (2013.12)

(58) Field of Classification Search
None
See application file for complete search history.

(56) References Cited

U.S. PATENT DOCUMENTS

| | | |
|---|---|---|
| 9,721,283 B2 | 8/2017 | Tanaka et al. |
| 9,818,106 B2 | 11/2017 | Lee |
| 2015/0106247 A1 | 4/2015 | Saft et al. |
| 2015/0310564 A1 | 10/2015 | Peterson |
| 2016/0196617 A1 | 7/2016 | Saft et al. |
| 2018/0011846 A1 | 1/2018 | Guzman et al. |
| 2018/0025225 A1 | 1/2018 | Guzman et al. |
| 2018/0300725 A1 | 10/2018 | Boncimino |
| 2020/0243174 A1* | 7/2020 | Burgess ............... G06F 40/279 |

* cited by examiner

*Primary Examiner* — Lennin R Rodriguezgonzalez
(74) *Attorney, Agent, or Firm* — M&B IP Analysts, LLC

(57) ABSTRACT

A system and method for determining vendor identity based on electronic documents analysis. The method includes receiving, by a computing device, a first electronic document. The first electronic document includes a plurality of textual items. The method also includes extracting, using the computing device, at least a first sequence of textual items from the plurality of textual items, determining a first approximate identity of a vendor entity that issued the first electronic document by comparing the first sequence of textual items to at least a second sequence of textual items that is associated with at least a second electronic document of a plurality of second electronic documents that was previously associated with a unique vendor entity, and extracting at least a first multiset of textual items from the plurality of textual items of the first electronic document.

17 Claims, 9 Drawing Sheets

SYSTEM AND METHOD THEREOF FOR DETERMINING VENDOR'S IDENTITY BASED ON NETWORK ANALYSIS METHODOLOGY

CROSS-REFERENCE TO RELATED APPLICATIONS

This application claims the benefit of U.S. Provisional Application No. 62/822,478, filed on Mar. 22, 2019, U.S. Provisional Application No. 62/822,481, filed on Mar. 22, 2019, U.S. Provisional Application No. 62/822,484, filed on Mar. 22, 2019, U.S. Provisional Application No. 62/861,075, filed on Jun. 13, 2019, and U.S. Provisional Application No. 62/925,100, filed on Oct. 23, 2019, the contents of which are hereby incorporated by reference.

TECHNICAL FIELD

The disclosure generally relates to system and methods for processing electronic documents, and more specifically for determining vendor's identity based on electronic documents analysis.

BACKGROUND

Enterprises all over the world often spend large amounts of money on goods and services purchased by the enterprises' employees in the course of their regular business dealings. Portions of these transactions may be refundable such that the enterprise can reclaim a Value Added Tax (VAT) or deduct qualified expenses from their corporate income tax. These expenses often must be reported to the relevant tax authorities in order to reclaim a tax refund.

In some jurisdictions, enterprises may subtract the amount paid in VAT from a total tax amount owned to a tax authority by calculating any VAT paid by the enterprise for expenses that have a qualified business justification. In some countries the subtraction may occur without providing an original price of evidences, e.g., a tax receipt, for such expenses. However, the original evidences may be required when a tax inspection is performed by a tax authority. Where an evidence is missing or in cases where the evidence is not an original one, the company may be at risk.

Currently, when evidences such as tax receipts are gathered in a large scale, the process of detecting whether a tax receipt actually contains all necessary transaction data items may be time consuming for the entity reviewing the evidences, as well as for the parties of the transaction, if their input is required.

In addition, in many cases it is desirable to determine the vendor's identity associated with a transaction made in order to apply the appropriate tax rules. Different products and services that a vendor provides are subjected to different tax rules and regulations. Normally, the vendor's identity has to be manually entered by either the vendor or the customer. Such method may be cumbersome, time consuming, and labor intensive, especially when tax receipts are entered in a large scale. Also, problems also arise when the vendor's identity is not entered by mistake.

There are available solutions by which enterprises collect and analyze data associated with expenses and purchases made by their employees. However, such solutions do not provide an efficient method of automatically determining a vendor's identity.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for determining vendor identity based on electronic documents analysis. The method comprising receiving a first electronic document having a plurality of textual items; extracting at least a first sequence of textual items from the plurality of textual items; determining a first approximate identity of a vendor entity that issued the first electronic document by comparing the first sequence of textual items to at least a second sequence of textual items that is associated with at least a second electronic document that was previously associated with a unique vendor entity; extracting a first multiset of textual items from the plurality of textual items of the first electronic document; determining a second approximate identity of a vendor entity that issued the first electronic document by comparing the first multiset of textual items to at least a second multiset of textual items that was previously associated with the unique vendor entity; and determining a specific identity of the vendor entity that issued the first electronic document upon determination that the first approximate identity and the second approximate identity are identical, otherwise performing a resolution process.

Certain embodiments disclosed herein also include a system for determining vendor identity based on electronic documents analysis, comprising: a processing circuitry; and a memory, the memory containing instructions that, when executed by the processing circuitry, configure the system to: receive a first electronic document having a plurality of textual items; extract at least a first sequence of textual items from the plurality of textual items; determine a first approximate identity of a vendor entity that issued the first electronic document by comparing the first sequence of textual items to at least a second sequence of textual items that is associated with at least a second electronic document that was previously associated with a unique vendor entity; extract a first multiset of textual items from the plurality of textual items of the first electronic document; determine a second approximate identity of a vendor entity that issued the first electronic document by comparing the first multiset of textual items to at least a second multiset of textual items that was previously associated with the unique vendor entity; and determine a specific identity of the vendor entity that issued the first electronic document upon determination that the first approximate identity and the second approximate identity are identical, otherwise performing a resolution process.

BRIEF DESCRIPTION OF THE DRAWINGS

The subject matter that is regarded as the disclosure is particularly pointed out and distinctly claimed in the claims at the conclusion of the specification. The foregoing and other objects, features and advantages of the disclosure will be apparent from the following detailed description taken in conjunction with the accompanying drawings.

DETAILED DESCRIPTION

Figure 1:
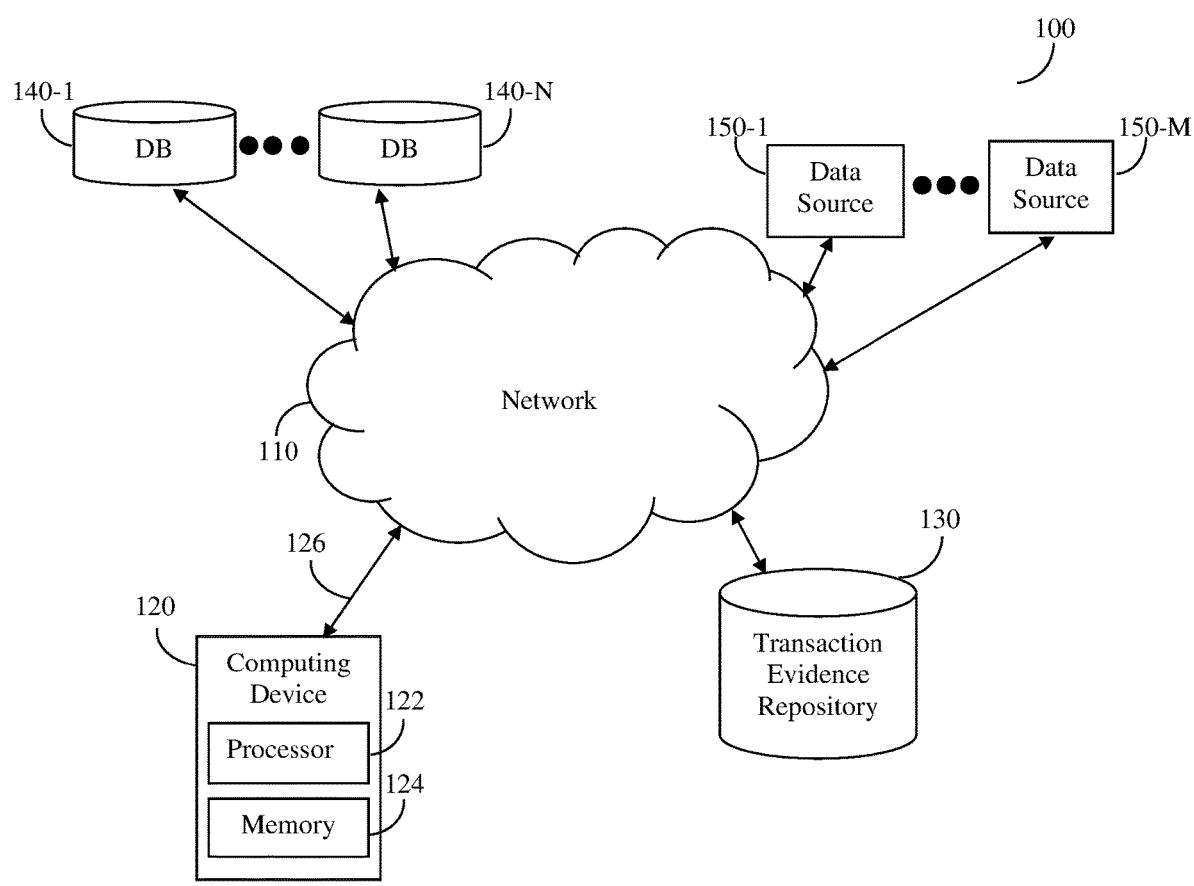
FIG. 1 is a network diagram utilized to describe the various disclosed embodiments.

It is important to note that the embodiments disclosed by the disclosure are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example network diagram 100 utilized to describe the various disclosed embodiments. In the example network diagram 100, a computing device 120, a plurality of databases 140-1 through 140-N (hereinafter referred to individually as a database 140 and collectively as databases 140, merely for simplicity purposes), a transaction evidence repository 130, and a plurality of data sources 150-1 through 150-M (hereinafter referred to individually as a data source 150 and collectively as data sources 150, merely for simplicity purposes) are communicatively connected via a network 110. The network 110 may be, but is not limited to, a wireless, cellular or wired network, a Local Area Network (LAN), a Wide Area Network (WAN), a Metro Area Network (MAN), the Internet, the World Wide Web (WWW), similar networks, and any combination thereof.

The computing device 120 is communicatively connected, using a network interface 126 to the network 110. In an embodiment, the computing device 120 is a combination of computer hardware and computer software components configured to execute predetermined computing tasks. The computing device 120 includes a processor 122 and a memory 124. The memory 124 contains therein instructions that when executed by the processor 122 configure the computing device 120 to execute actions as further described herein below. In an embodiment the computing device 120 is, or consists of, an analyzer that is adapted to perform the tasks described herein. Such an analyzer can, for example, identify and extract data items, e.g. textual data items.

The transaction evidence repository 130 may include a plurality of electronic documents. Such electronic documents may include, but is not limited to, evidentiary electronic documents including information related to transactions. The evidentiary electronic documents may include, but are not limited to, invoices, receipts, and the like.

The database 140 may be configured to store, for example, images of transaction evidences (e.g., electronic documents) that were previously analyzed. The previously analyzed images (e.g., electronic documents) may include for example invoices that include textual items that describe the goods or services rendered, that were previously analyzed such that, for example, the vendor entity provided the service or the goods, is determined. According to another embodiment, the database 140 is used for storing data files that contain only the extracted data that have been extracted from electronic documents, without the electronic document itself. According to another embodiment, the database 140 may store only the extracted data determined to be useful for the purpose of determining the identity of a vendor that issued a new electronic document.

The data source 150 may be an electronic data source such as a website, a data warehouse, a cloud database, etc. that may also store data that is associated with and extracted from the electronic documents.

In an embodiment, the computing device 120 is configured to receive a first electronic document. The first electronic document includes a plurality of textual items. Textual items may be for example, characters, letters, digits, words, sentences, symbols, and so on. The first electronic document may be a transaction evidence, for example, an invoice issued by a vendor entity. The first electronic document may be received or collected from, for example, the transaction evidence repository 130, the database 140, a data source (e.g., the data source 150), from a user device (not shown), etc. A user device may be for example, a smartphone, a tablet, a laptop.

In an embodiment, the computing device 120 is configured to perform a cleaning process of the textual items of the first electronic document. The cleaning process may include, for example, lower case detection, tokenizing, stemming, digits, punctuation, removal of repeated characters, electronic mail (email) addresses, domain stop-words [e.g., Value Added Tax ("VAT"), "invoice", "tax", etc.].

In an embodiment, the computing device 120 is configured to extract using, for example, computer vision technique, e.g., Optical Character Recognition (OCR), at least a first sequence of textual items from the plurality of textual items of the first electronic document. The at least a first sequence of textual items may include one or more contiguous sequences of characters, symbols, words, digits, and the like.

The sequence of textual items may be referred to as ngrams. The at least a first sequence of textual items also includes a first set of characteristics. The first set of characteristics may be indicative of, for example, the number of the units (e.g. words or letters) the first sequence is composed of, each unit's content, the order of every unit in the sequence, and so on. For example, a first sequence may be: "Hilton", "Paris", "France". As further discussed herein below, the set of characteristics of each sequence may be used, among other things, for determining association between two or more electronic documents.

In an embodiment, the computing device 120 is configured to determine a first approximate identity of a vendor entity that issued the first electronic document. The determination may be achieved by comparing the first sequence of textual items to at least a second sequence of textual items that is associated with at least a second electronic document of a plurality of second electronic documents that was previously associated with a unique vendor entity as further discussed herein below. In order to determine the first approximate identity of the vendor entity that issued the first electronic document the computing device 120 is configured to perform the following comparisons.

The computing device 120 is configured to perform a first comparison between the first sequence of textual items and at least a second sequence of textual items of a plurality of second electronic documents that is associated with at least a second electronic document of a plurality of second electronic documents. Each of the plurality of second electronic documents is previously associated with a unique vendor entity. The second sequence of textual items may include one or more contiguous sequences of characters, symbols, words, digits, etc. and may be referred to as ngrams. The at least a second sequence of textual items may also include a second set of characteristics. The second set of characteristics may be indicative of, for example, the number of the units (e.g. words, letters, etc.) the second sequence is composed of, each unit's content, the order of every unit in the sequence, and so on. For example, a second sequence may be identical to the first sequence, totally different, partially similar, etc.

In an embodiment, the first comparison may be achieved by comparing the first set of characteristics to the second set of characteristics of the at least a second sequence of textual items of the plurality of second electronic documents. The second electronic documents may be for example a plurality of invoices that were previously analyzed and thereafter associated with a unique vendor entity. The unique vendor entity may be, for example, a specific branch of a hotel chain having a unique VAT identifier. For example, it may be previously determined that 10,000 out of 2,000,000 invoices (e.g., second electronic documents) that were previously processed were issued by the London Marriott® Hotel County Hall, which is a branch of the Marriott® hotel chain.

For the first comparison, the computing device 120 is further configured to generate based on the first comparison, for each of the at least a second sequence of textual items of the plurality of second electronic documents, a sequence matching score with respect to each of the at least a first sequence of textual items. The sequence matching score indicates a similarity level between two or more sequences of textual items. The sequence matching score may include a scale from '0'-'10' where '0' indicates that there is no association between a first and a second sequence and '10' indicates that the two sequences are identical. Identical sequences may have the same number of units, same content, same units' order.

Generating the sequence matching score with respect to each of the at least a first sequence of textual items may include, for example, generating multiple sequence matching scores that indicate similarity level between the first sequence and multiple second sequences that are associated with multiple electronic documents. Thus, after the sequence matching scores of each of the second sequences are generated, the score may be indicative of an association level, or link, between the first electronic document and the second electronic document.

In an embodiment, generating the sequence matching score between a first sequence of textual items of a first electronic document and at least a second sequence of textual items of a second electronic document is achieved by calculating Term Frequency-Inverse Document Frequency (TFIDF) weight for all textual items (e.g., words) of each sequence (e.g., n-gram) of textual items. Thus, a TFIDF weight may also be generated for each sequence of textual items. The TFIDF weight may be indicative of the approximate textual item's (e.g., word's) importance. Thus, only textual items having a TFIDF weight that is above a predetermined threshold may be used by the computing device 120 for calculating and generating the sequence matching score. For example, a first sequence out of '10' sequences of a first electronic document may include words that have a relatively low TFIDF weight and therefore the first sequence may not be used for calculating and generating the sequence matching score between the sequences of the first electronic document and the sequences of a second electronic document.

In an embodiment, calculation of textual item (e.g., a word) score is based TFIDF weights as an approximation to textual item's (e.g., word's) importance. A word may be considered as important if it was found as important at least in one of the documents in a corpus. Thus, TFIDF based weight for importance of word m can be represented as:

$$weight_m = \max_{d \in D}(tfidf_{m,d})$$

where D denotes set of electronic documents (e.g., invoices) in corpus, where d denotes a document within D, and $tfidf_{m,d}$ is a score of word m in document d.

The computing device 120 is further configured to search, based on each of the generated sequence matching scores, for at least a second electronic document of the plurality of second electronic documents, having a sequence matching score that is above a first predetermined threshold. The search may be performed throughout a database (e.g., the database 140). The first predetermined threshold may be, for example, a sequence matching score of '9' out of '10'. That is, the computing device 120 is configured to search for one or more second electronic documents having one or more sequences indicating a high level of similarity between the at least a first sequence and the at least a second sequence. In an embodiment, the at least a second electronic document is previously associated with a unique vendor entity.

The computing device 120 is further configured to determine the first approximate identity of the vendor entity that issued the first electronic document based on the previously associated identity of the unique vendor entity that issued the second electronic document. The first approximate identity of the vendor may include the vendor's name, VAT identifier, vendor's address, and so on. For example, it is previously determined that a second electronic document (e.g., a second invoice) has been issued by Hilton® Amsterdam hotel. According to the same example, when the first electronic document (e.g., a new invoice) is analyzed, one or more sequences of textual items of the first electronic document and of the second electronic document are compared (e.g., the characteristics may be compared) and thereafter indicate that the first electronic document and the second electronic document are similar above a threshold. Therefore, it is determined that the vendor (e.g., Hilton® Amsterdam) that issued the second electronic document is the same vendor that issued the first electronic document.

In an embodiment, determining the first approximate identity of a vendor entity that issued the first electronic document is achieved where $n_{ij}$ is an order of common ngram for invoices i and j. To detect common ngrams, cleaned text of each invoice is presented as a set of all possible obtainable ngrams. In one embodiment, the 2nd, 3rd, and 4th orders are extracted. The link function between invoices i, j is presented as:

$$l_{ij} = \sum_{k=1}^{K} n_k^{score(n_k)}$$

where K is a number of common ngrams for i and j, and $score_{(nk)}$ is a sum of TFIDF based weights of all words in ngram k.

In an embodiment, the computing device 120 is further configured to extract at least a first multiset of textual items from the plurality of textual items of the first electronic document. The first multiset of textual items may be extracted using a Bag-of-Words (BOW) model by which the electronic document is represented as the multiset of its words. That is, the textual items (e.g., words) that exist in the first electronic document are transformed into a first multiset that enables to calculating various measures to characterize the text. For example, using the BOW model a term (e.g., a word) frequency in the electronic document, can be detected. For example, using the BOW model, it is determined that the terms "Hilton", "Amsterdam", "Schiphol", "Boulevard" and "701" exist in the first electronic document, that the word "Hilton" was mentioned three times and that the word "Schiphol" was mentioned twice. In a further embodiment, the computing device extracts a first set of textual items (and not a multiset).

In an embodiment, the computing device 120 is further configured to determine a second approximate identity of a vendor entity that issued the first electronic document by comparing the first multiset (or set) of textual items to at least a second multiset of textual items that was previously associated with a unique vendor entity. In order to determine the second approximate identity of the vendor entity that issued the first electronic document, the computing device 120 is configured to perform second comparison, and process the results thereof.

In an embodiment, the computing device 120 is configured to perform a second comparison between the at least a first multiset (or set) of textual items of the first electronic document and the at least a second multiset of textual items that was previously associated with a unique vendor entity. The second multiset of textual items may be previously extracted using the aforementioned BOW model, by which the previously analyzed second electronic documents are represented as the multiset of their words. That is, textual items (e.g., words) that exist in a previously analyzed second electronic document are transformed into a second multiset that enables calculating various measures to characterize the text. For example, using the BOW model a term (e.g., a word) frequency in the second electronic document, can be detected.

In an embodiment, by determining terms' frequency for each of the second electronic documents, a multiset (i.e., BOW) for each vendor can be generated and stored as a data file. For example, the terms "Hilton", "Amsterdam", "Schiphol", "Boulevard" and "701" exist in each of the 14,000 previously analyzed invoices, that were previously associated with a specific branch of Hilton hotels chain called Hilton Amsterdam Schiphol hotel. Thus, although the word "Hilton" may exist in other invoices without the terms "Schiphol" and "701", the other invoices shall not be associated with the Hilton Amsterdam Schiphol hotel. For example, the first extracted multiset (BOW) indicates that the terms "Hilton", "Amsterdam", "Schiphol", "Boulevard" and "701" exist in the first electronic document. Thus, the computing device 120 compares the first multiset to at least a second multiset, or a plurality of second multisets that may include the same textual items (BOW). The comparison may facilitate detection of similarity between the first multiset and at least a second multiset, as further discussed herein. In a further embodiment, the BOW model may be designed to detect words that are associated with vendors, such as, addresses, phone numbers, names, etc.

In an embodiment, the computing device 120 is configured to generate, based on the second comparison, a textual items' matching score for each of the at least a first multiset of textual items with respect to each of the at least a second multiset of textual items. A relatively high textual items' matching score indicates that a specific group of words that was detected in the first electronic document, exists in a relatively high frequency in a second multiset of textual items that is associated with a unique vendor.

The textual items' matching score may include a scale from '0'-'10' where '0' indicates that there is no association between a first multiset of textual items and a second multiset of textual items, and '10' indicates that the two multisets of textual items are identical. For example, although the words "car", "rental" and "Germany" exist in 400,000 invoices that were previously analyzed, the first multiset includes the terms "car", "rental", "Sixt®", "Germany", "Munich" and "Airport". Therefore, a relatively high textual items' matching score is generated with respect to a second multiset that includes the terms "car", "rental", "Sixt®", "Germany", "Munich" and "Airport".

According to the same example, it should be noted that the multiset of textual items that includes the terms "car", "rental", "Sixt®", "Germany", "Munich" and "Airport" may be previously associated with a unique vendor such as a branch of Sixt® car rental company located at Munich, Germany airport. Therefore, the second multiset that is previously associated with the unique vendor entity may have a high textual items' matching score with respect to the first multiset, which may indicate that the first electronic document (e.g., invoice) was issued by the same vendor entity, e.g., the Munich, Germany branch of Sixt® car rental company. To this end, two different branches of the same company are considered as two different vendors entities. In an embodiment, the generation of the textual items' matching score is achieved by calculating a frequency level of at least a portion of the first multiset of textual items, at the at least a second multiset of textual items.

In an embodiment, a link function I between a vendor invoice $v_i$ and vendor invoice $v_j$ is determined as follows. $Iv_iv_j$ is equal to '1' if invoices $v_i$ and $v_j$ have the same BOW-detected vendor; $Iv_iv_j$ is equal to '−1' if no vendors were detected for $v_i$ and $v_j$; and, $Iv_iv_j$ is equal to '0' otherwise. The link function may indicate the association level between a first electronic document and at least a second electronic document.

In an embodiment, a link function between two invoices may be determined by:

$$l_{ij}^* = \begin{cases} l_{ij}, & \text{if } I_{v_i v_j} = -1 \ \& \ l_{ij} > c \\ l_{ij} + \min(w_i, w_j), & \text{if } I_{v_i v_j} = 1 \\ 0, & \text{otherwise} \end{cases}$$

where is a pre-defined threshold value. $l_{ij}^*$ equals to '0' when different vendors were detected, and therefore no link exists between i and j.

In an embodiment, the computing device 120 is configured to search, based on the generated textual items' matching scores, for at least a second multiset of textual items that is associated with a unique vendor entity, and that have a textual items' matching score that is above a second predetermined threshold. The second predetermined threshold may be, for example, a score of '9' out of '10'.

That is, the computing device 120 is further configured to search for a second multiset (BOW that is associated with a unique vendor) that contains the terms (e.g., words) that exist in the first multiset, in a relatively high frequency. Thus, although multiple multisets may include the words "hotel", only the Paris Marriott® Opera Ambassador hotel located in Paris, France may be associated with a multiset that also includes the word "Opera" (in addition to the words "hotel", "Paris", etc.). Therefore, several multisets that were previously determined (and may be periodically updated) may have different textual items' matching scores indicating the textual items (terms) frequency of the first electronic document in each of the several multisets. For example, 5,000 multisets of textual items are previously associated with 5,000 different vendors entities.

According to the same example, when a first multiset of a new electronic document is compared to multiple second multisets of textual items, it is determined, by the system 120, that the word "hotel" exists in 2,000 of the second multisets, such that a matching score (relatively low one) may be generated with respect to the 2,000 multisets. According to the same example, only one multiset of the 2,000 multisets (e.g., a multiset that is associated with the Paris Marriott® Opera Ambassador hotel) also includes the words "Opera", "Marriot" and "Paris" which also exist in the first multiset of the first electronic document.

Therefore, the computing device 120 may generate the highest textual items' matching score for the second multiset that includes the textual items "Opera", "Marriot", "Paris" and "hotel". Thus, the when the computing device 120 searches for at least a second multiset of textual items that have a textual items' matching score that is above the second predetermined threshold, the multiset that is previously associated with the Paris Marriott® Opera Ambassador hotel located in Paris, France, may be the result having the highest textual items' matching score compared to the rest of the second multisets that are associated with different vendors entities.

The computing device 120 is further configured to determine a second approximate identity of the vendor entity that issued the first electronic document based on a predetermined identity of the unique vendor entity to which the second multiset of textual items is associated with. For example, the result of the search indicates that the vendor entity that is associated with the second multiset having the highest textual items' matching score is the San Francisco Avis® car rental company branch that is located at 333 OFarrell Street, San Francisco, Calif., 94102, USA. Thus, the computing device 120 determines the second approximate identity of the vendor entity that issued the first electronic document is the San Francisco Avis® car rental company branch that is located at 333 OFarrell Street, San Francisco, Calif., 94102, USA.

In an embodiment, determining the second approximate identity of the vendor entity that issued the first electronic document, is determined by:

$$\text{Vendor}(invoice_i) = \text{argmax}_{vendors}(|\text{cleaned\_text}_i \cap \text{BOW}_k|), k=1, \ldots, n_{vendors}$$

where the size of union in brackets is a weight of link between invoice i and vendor k (denoted by $w_i$), $\text{BOW}_k$ is the BOW of vendor k, $\text{cleaned\_text}_i$ is the cleaned text of invoice i, and the predicted BOW is detected per vendor for invoice i.

In an embodiment, the computing device 120 is configured to determine a specific identity of the vendor entity that issued the first electronic document upon determination that the first approximate identity and the second approximate identity are identical, otherwise performing a resolution process. As further discussed herein above, the computing device 120 determines the first approximate identity of the vendor entity that issued the first electronic document and the second approximate identity of the vendor entity that issued the first electronic document.

That is, the computing device 120 is further configured to determine two approximate identities that are based on two different methods. In the first method the computing device 120 uses the sequences of the textual items (e.g., ngrams) that exist within the first electronic document and in the plurality of second electronic documents. In the second method the computing device 120 is configured to use the first multiset of textual of the first electronic document and the previously analyzed and stored second multisets that are associated with a unique vendor entity. In case the identity of the two approximate vendor entities is identical, the computing device 120 determines a specific and accurate identity of the vendor entity that issued the first electronic document.

In an embodiment, when the identity of the two approximate vendor entities is nonidentical the computing device 120 may be configured to perform a resolution process. The resolution process may include for example, determining a disconnection between the first electronic document and the at least a second electronic document. Determining disconnection between two or more electronic documents (e.g., invoices) indicates that the two or more electronic documents were issued by different vendors entities.

In an embodiment, the computing device 120 is configured to associate the determined specific identity of the vendor entity that issued the first electronic document with the first electronic document. The association may include classifying or tag the first electronic document with respect to the specific vendor entity that issued the first electronic document.

In a further embodiment, the computing device 120 periodically updates a data file that contains the at least a second sequence of textual items that is associated with at least a second electronic document of the plurality of second electronic documents that is previously associated with a unique vendor entity. That is, from time to time vendors may change their invoices' details, thus in order to be able to perform the disclosed method across time, the computing device 120 periodically updates the sequences that were extracted.

According to another embodiment, the computing device 120 is configured to compute and generate an association level (e.g., link) indicating the connection level between each of the first electronic document and at least part of the plurality of the second electronic documents. The calculation of the association level between the electronic documents may be achieved using the generated sequence matching score, as further discussed herein above. That is, there may be multiple electronic documents (e.g., invoices) that may have different associations. The association levels are based on the sequences of textual items of the electronic documents such that a first electronic document may have a high association level (e.g., 10 out of 10) with respect to a second electronic document based on the sequences of the second electronic document, and the first electronic document may also have a medium association level (e.g., 5 out of 10) with a third electronic document based on the sequences of textual items.

In an embodiment, the association level between a new electronic document and a trained electronic document is presented by $I_{v\_train_i, v\_new_j}$. $I_{v\_train_i, v\_new_j}$ equals to '1' if vendor of trained invoice i is equal to BOW-detected vendor of the new electronic document invoice j, and equal to '0' otherwise.

In an embodiment, the computing device 120 is configured to apply a set of rules for improving the accuracy of the link function and for reducing the processing time of a new invoice with respect to a plurality of trained invoices (i.e., second electronic documents). The set of rules may determine, for example, that a new invoice must be compared only to trained invoices that were issued by companies that are located at the same country at which the company that issued the new invoice is located. The set of rules may also determine that a new invoice must be compared only to trained invoices having the same expense type. For example, a new invoice indicating a hotel stay of two nights in France, may be compared to other invoices indicating a hotel stay that were issued in France. According to the same example, the computing device 120 is configured to ignore trained invoices that indicate other countries, except France and expense types other than hotels. As a non-limiting example, $I_{E,C}$ is equal to '1' for expense type E and country C, and 0 otherwise. A new received invoice will have $I_{v\_train_i, v\_new_j}$ that is equal to '1' if the vendor in invoice i is equal to BOW-detected vendor in the new invoice j, and '0' otherwise. The weight the of BOW-detected vendor for the new invoice is $w_j$ if $I_{v\_train_i, v\_new_j} = 1$, and '0' otherwise. The final link function between a new invoice j and the invoice i is determined to be:

$$l_{ij}^* = I_{E,C}^*(l_{ij} + w_j), \text{ if } l_{ij} > c$$

For each new invoice, an invoice i is chosen such that $l_{ij}^*$ has a maximum value for the invoice j. One of ordinary skill in the art would readily appreciate that the invoice i acts as a "donor", that is, the vendor of invoice i is assigned also to the new invoice j if appropriate.

In a further embodiment, the computing device 120 may be configured to execute a training phase at which electronic documents (e.g., invoices) are processed and a network (e.g., a multidimensional graph) of electronic documents is generated. To this end, the computing device 120 may be configured to generate a network of electronic documents where the electronic documents (e.g., invoices) are defined as nodes having edges that may be defined by the following link function:

$$l_{ij} = \sum_{k=1}^{K} n_k^{score_k}$$

where K is a number of common ngrams for i and j, and $score_k$ is a sum of TFIDF based weights of all words in ngram k.

In the training phase the computing device 120 may extract and determine multiple sequences (e.g., ngrams) of textual items that are associated with electronic documents. Based on the link function, common sequences (e.g., ngrams) are determined such that the computing device 120 may be configured to determine the association level between at least part of the electronic documents to which the sequences are associated with. It should be noted that when a new electronic document (e.g., an invoice) is received, the electronic document is added as a node to the network of electronic documents.

In a further embodiment, the computing device 120 may generate a multidimensional graph based on association levels (e.g., links) between the electronic documents. The multidimensional graph may include a plurality of nodes representing the electronic documents (e.g., the invoices) and a plurality of links that represent the association levels between the electronic documents (e.g., the invoices). The nodes' position in the graph may be determined by the computing device 120 with respect to the association levels between the electronic documents as determined using, for example, the sequence matching score.

For example, all electronic documents (e.g., invoices) that were issued by a vendor entity called "Avis, San Francisco" may be located in close proximity (in the graph) to each other, having a high association level between each other. On the other hand, an electronic document (e.g., an invoice) having poor association level, or having no association at all, with the electronic documents that were issued by the "Avis, San Francisco" vendor entity, may be positioned away from the group of electronic documents that were issued by the "Avis, San Francisco" vendor entity. The links indicate the association levels between two or more electronic documents. A link may include a score indicating the association level between two electronic documents.

In an embodiment, the computing device may be configured to apply clustering over the network of electronic documents (e.g., invoices) and/or over the multidimensional graph. The clustering may include, for example, presenting all invoices that are associated with a specific vendor, invoices from a specific region or country, invoices of a specific expense type, and so on. That is, homogeneous clusters may be generated using the generated network of electronic documents.

According to another embodiment, after a new electronic document (e.g., an invoice) is received and analyzed (using sequences and multisets of textual items) as further discussed herein above, the new electronic document may be associated with a cluster of electronic documents. The computing device 120 may determine a label for each cluster of electronic documents. A label may be for example the name of a vendor that is the most common vendor among all invoices in the cluster of a certain cluster. For example, a cluster of invoices of hotels in England may include 99% invoices that issued by the Marriott® hotel and 1% invoices that were issued by Hilton®. Thus, upon determination that the electronic document relates to a hotel stay in England, the computing device 120 may determine that the name of the hotel is Marriott based on the high frequency of invoices issued by the Marriott hotel in the specific cluster of invoices.

It should be noted that the system and method thereof for detecting vendor identity that issued an electronic document that is described herein above and below, may also be used for automatically detecting various parameters, patterns, and so on (not only vendor detection). For example, other parameters that may be detected using the disclosed method may include, an expense type of an invoice, a VAT breakdown, VAT indication, a country at which the electronic document was issued, and so on.

Figure 2:
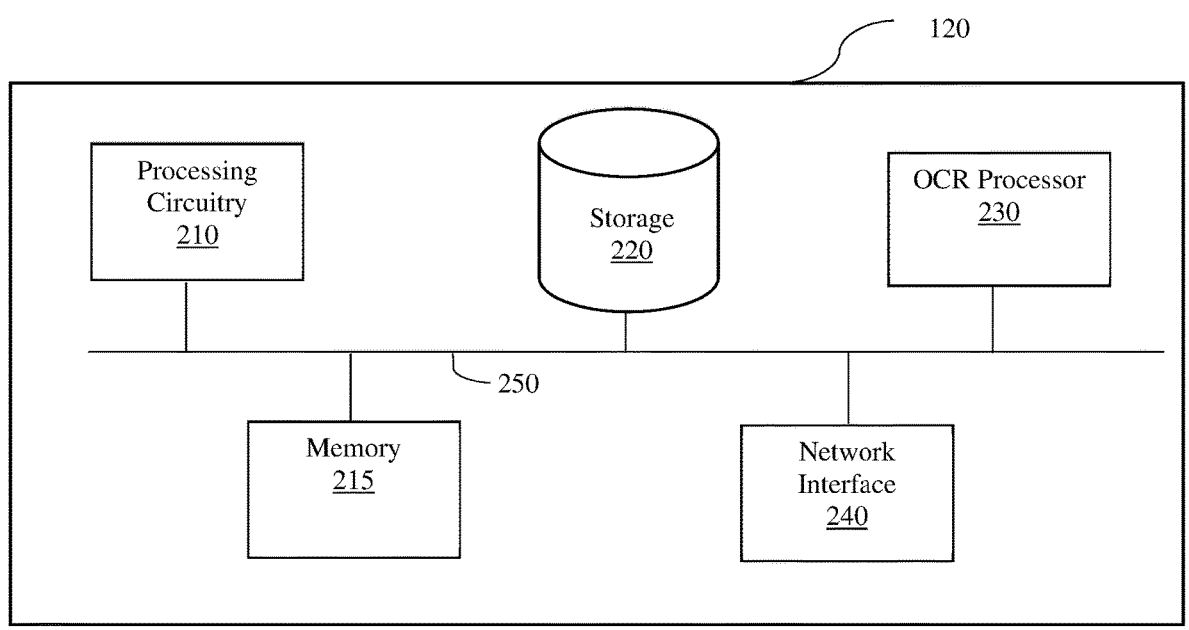
FIG. 2 is a schematic diagram of a computing device according to an embodiment.

FIG. 2 is an example schematic diagram of the computing device 120 according to an embodiment. The computing device 120 includes a processing circuitry 210 coupled to a memory 215, a storage 220, an OCR processor 230, and a network interface 240. In an embodiment, the components of the computing device 120 may be communicatively connected via a bus 250.

The processing circuitry 210 may be realized as one or more hardware logic components and circuits. For example, and without limitation, illustrative types of hardware logic components that can be used include Field programmable Gate Arrays (FPGAs), Application-Specific Integrated Circuits (ASICs), Application-Specific Standard Products (ASSPs), System-On-a-Chip systems (SOCs), general-purpose microprocessors, microcontrollers, Digital Signal Processors (DSPs), and the like, or any other hardware logic components that can perform calculations or other manipulations of information.

The memory 215 may be volatile (e.g., Random Access Memory (RAM), etc.), non-volatile (e.g., Read-Only Memory (ROM), flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processing circuitry 210, cause the processing circuitry 210 to perform the various processes described herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The OCR processor 230 may include, but is not limited to, a feature and/or pattern recognition unit (RU) configured to identify patterns, features, or both, in at least partially unstructured datasets. The OCR processor 230 may be configured to extract textual data items from electronic documents as further described herein above with respect of FIG. 1.

The network interface 240 allows the computing device 120 to communicate with the transaction evidence repository 130, the database 140, for the purpose of, for example, retrieving data, storing data, and the like.

It should be understood that the embodiments described herein are not limited to the specific architecture illustrated in FIG. 2, and other architectures may be equally used without departing from the scope of the disclosed embodiments.

Figure 3:
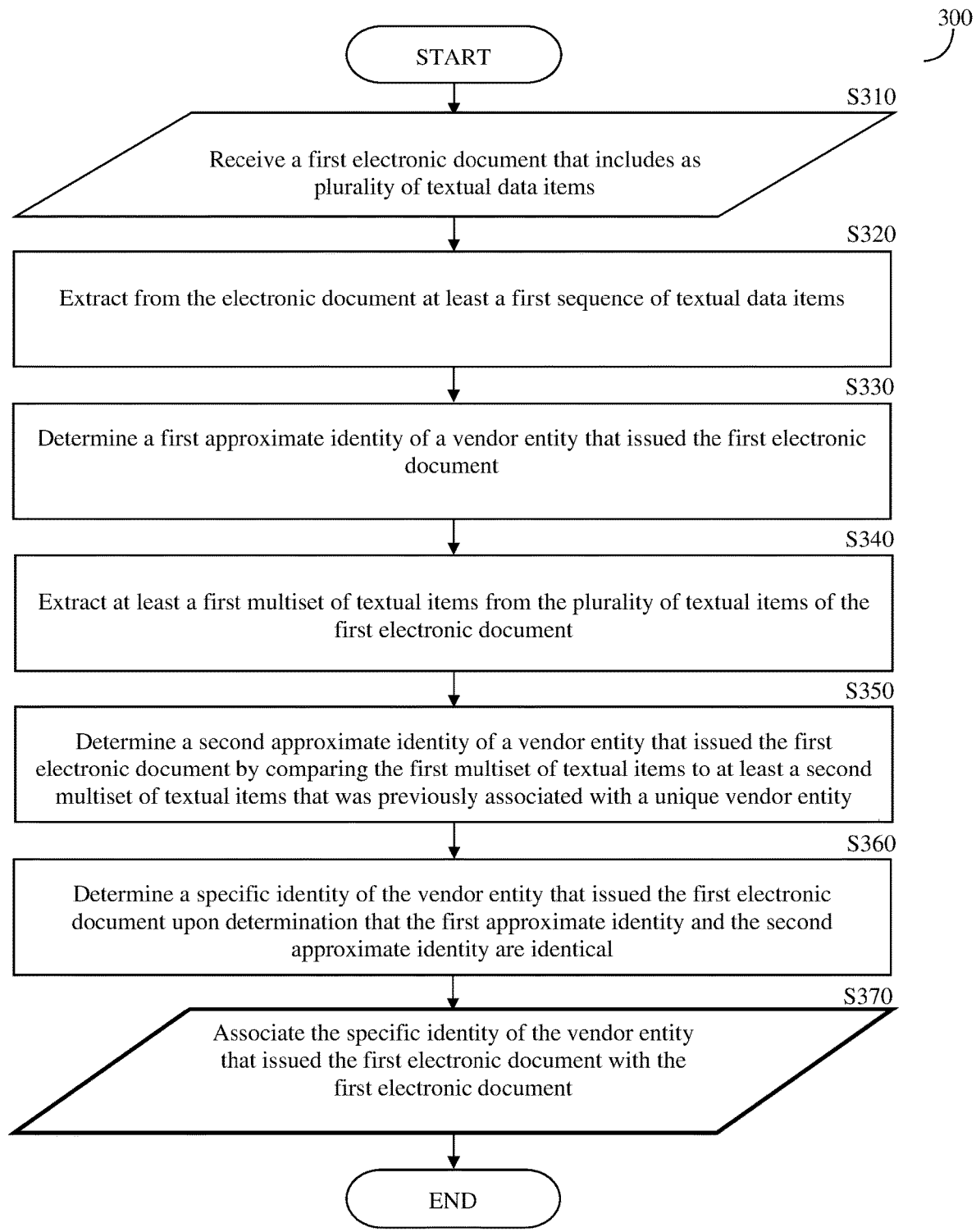
FIG. 3 is a flowchart illustrating a method for determining vendor's identity based on electronic documents analysis, according to an embodiment.

FIG. 3 is an example flowchart 300 illustrating a method for determining vendor identity based on electronic documents analysis, according to an embodiment. In an embodiment, the method may be performed by the computing device 120.

At S310, a first electronic document is received. The first electronic document includes a plurality of textual items. Textual items may be for example, characters, letters, digits, words, sentences, symbols, and so on.

At S320, at least a first sequence of textual items is extracted from the plurality of textual items of the first electronic document. The first sequence of textual items may include one or more contiguous sequences of characters, symbols, words, digits, etc. and may be referred to as ngrams. The at least a first sequence of textual items also includes a first set of characteristics. The first set of characteristics may be indicative of, for example, the number of the units (e.g. words or letters) the first sequence is made of, each unit's content, the order of every unit in the sequence, and so on.

At S330, a first approximate identity of a vendor entity that issued the first electronic document is determined. The determination may be achieved by comparing the first sequence of textual items to at least a second sequence of textual items that is associated with at least a second electronic document of a plurality of second electronic documents that was previously associated with a unique vendor entity. S330 is further discussed herein below with respect of FIG. 4.

At S340, at least a first multiset of textual items is extracted from the plurality of textual items of the first electronic document. The first multiset of textual items may be extracted using a Bag-of-Words (BOW) model, by which the electronic document is represented as the multiset of its words.

At S350, a second approximate identity of a vendor entity that issued the first electronic document is determined by comparing the first multiset of textual items to at least a second multiset of textual items that was previously associated with a unique vendor entity. S350 is further discussed herein below with respect of FIG. 5.

At S360, a specific identity of the vendor entity that issued the first electronic document is determined upon determination that the first approximate identity and the second approximate identity are identical, otherwise a resolution process is performed. The resolution process may include for example, determining a disconnection between the first electronic document and the at least a second electronic document. Determining disconnection between two or more electronic documents (e.g., invoices) indicates that the two or more electronic documents were issued by different vendors entities.

Optionally, at S370, the determined specific identity of the vendor entity that issued the first electronic document is associated with the first electronic document. The association may include classifying or tag the first electronic document with respect to the specific vendor entity that issued the first electronic document.

Figure 4:
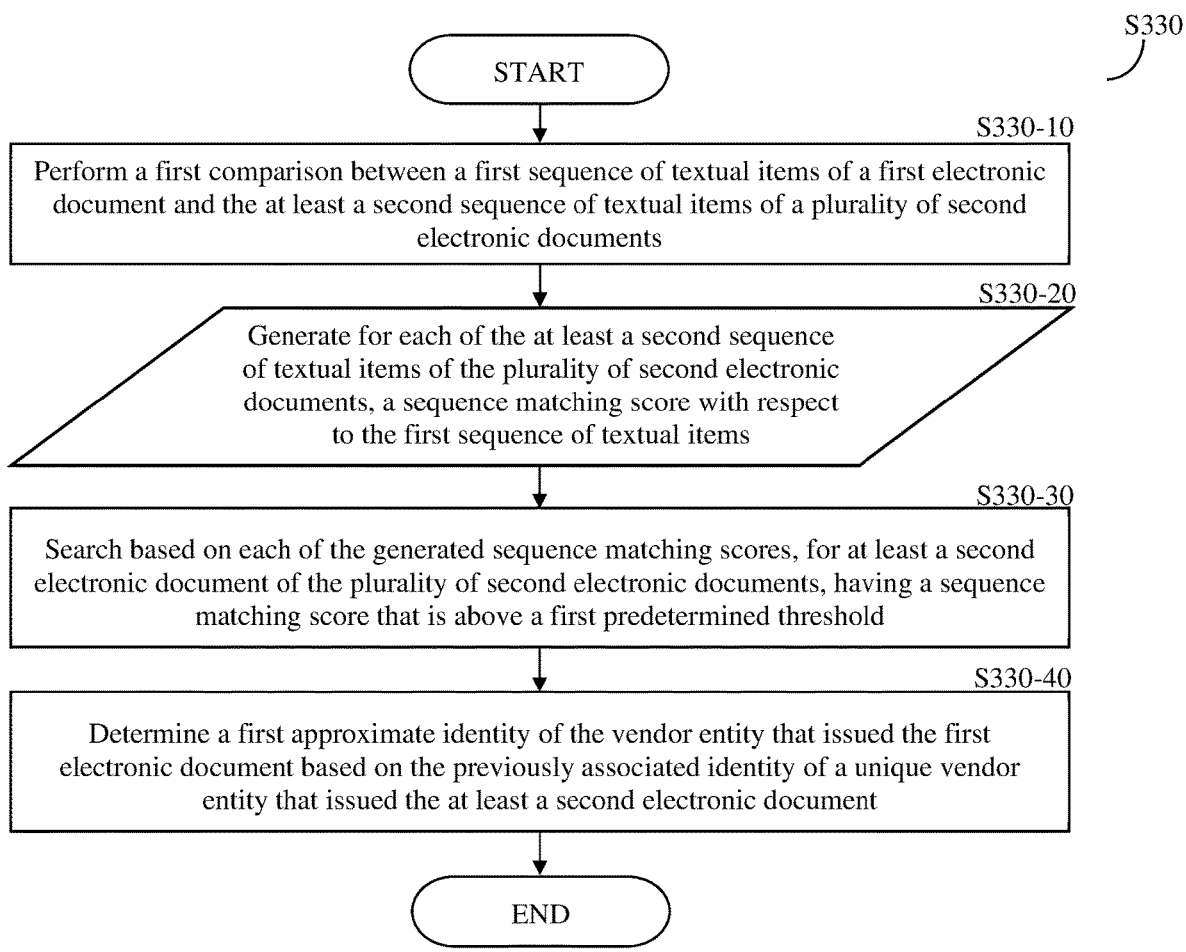
FIG. 4 is a flowchart illustrating a method for determining a first approximate identity of a vendor entity that issued a first electronic document based on textual items' sequences, according to an embodiment.

FIG. 4 is an example flowchart 330 illustrating a method for determining a first approximate identity of a vendor entity that issued a first electronic document based on textual items' sequences, according to an embodiment. In an embodiment, the method may be performed by the computing device 120.

At S330-10, a first comparison is performed between a first sequence of textual items, and at least a second sequence of textual items of a plurality of second electronic documents that is associated with at least a second electronic document of a plurality of second electronic documents.

Each of the plurality of second electronic documents is previously associated with a unique vendor entity. The second sequence of textual items may include one or more contiguous sequences of characters, symbols, words, digits, etc. and may be referred to as ngrams. The at least second sequence of textual items may also include a second set of characteristics. The second set of characteristics may be indicative of, for example, the number of the units (e.g. words, letters, etc.) the second sequence is composed of, each unit's content, the order of every unit in the sequence, and so on.

At S330-20, a sequence matching score is generated for each of the at least a second sequence of textual items of the plurality of second electronic documents with respect to the each of the at least a first sequence of textual items. The sequence matching score may indicate the similarity level between two or more sequences of textual items. Generating the sequence matching score may be achieved by calculating Term Frequency-Inverse Document Frequency (TFIDF) weight for all textual items (e.g., words) of each sequence (e.g., ngram) of textual items. The TFIDF weight may also be generated for each sequence of textual items. The TFIDF weight may be indicative of the approximate textual item's (e.g., word's) importance as further discussed herein above with respect of FIG. 1.

At S330-30, based on each of the generated sequence matching scores, a search is performed for at least the second electronic document of the plurality of second electronic documents having a sequence matching score that is above a first predetermined threshold. The at least second electronic document is previously associated with a unique vendor entity.

At S330-40, the first approximate identity of the vendor entity that issued the first electronic document is determined based on the previously associated identity of the unique vendor entity that issued the at least second electronic document.

Figure 5:
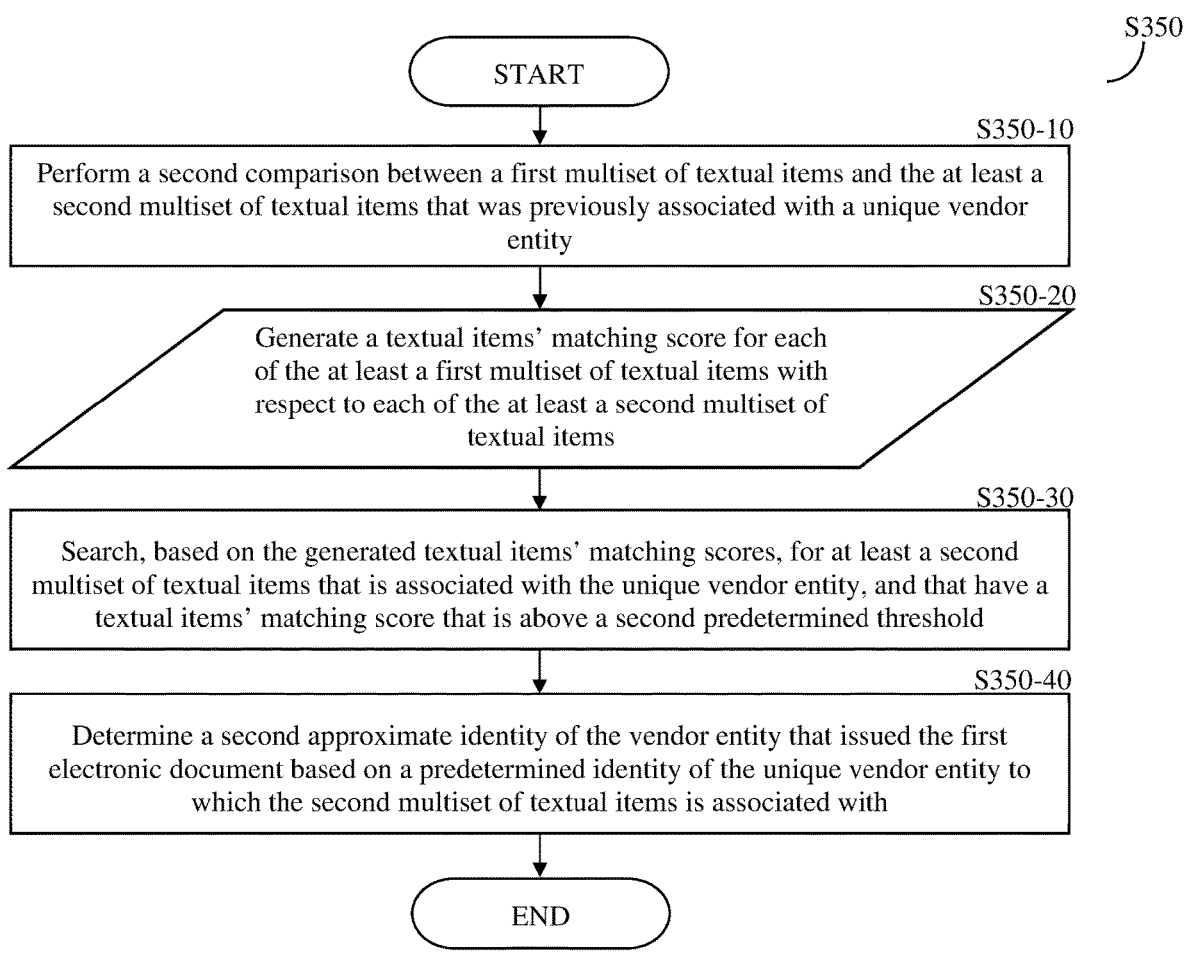
FIG. 5 is a flowchart illustrating a method for determining a second approximate identity of a vendor entity that issued a first electronic document based on textual items, according to an embodiment.

FIG. 5 is an example flowchart 350 illustrating a method for determining a second approximate identity of a vendor entity that issued a first electronic document based on textual items, according to an embodiment. In the embodiment, the method may be performed by the computing device 120.

At S350-10, a second comparison between at least a first multiset of textual items of a first electronic document and the at least the second multiset of textual items that was previously associated with the unique vendor entity, is performed. The at least the second multiset of textual items may be previously extracted using the BOW model by which the previously analyzed second electronic documents are represented as the multiset of their words. That is, textual items (e.g., words) that exist in a previously analyzed second electronic document are transformed into a second multiset that enables calculating various measures to characterize the text. For example, using the BOW model, a term (e.g., a word) frequency in the second electronic document can be detected. In an embodiment, by determining terms' frequency for each of the second electronic documents, a multiset (i.e., BOW) for each vendor can be generated and stored as a data file.

At S350-20, a textual items' matching score is generated for each of the at least a first multiset of textual items with respect to each of the at least a second multiset of textual items. For example, a relatively high textual items' matching score indicates that a specific group of words that was detected in the first electronic document, exists in a relatively high frequency in a second multiset of textual items that is associated with a unique vendor.

At S350-30, a search is performed, based on the generated textual items' matching scores, for at least a second multiset of textual items that is associated with a unique vendor entity, and that have a textual items' matching score that is above a second predetermined threshold. The second predetermined threshold may be, for example, a score of 9 out of 10. That is, the computing device 120 searches for a second multiset (BOW that is associated with a unique vendor) that contains the terms (e.g., words) that appear in the first multiset, in a relatively high frequency.

At S350-40, a second approximate identity of the vendor entity that issued the first electronic document is determined based on a predetermined identity of the unique vendor entity to which the second multiset of textual items is associated with.

With the system and method described above, a vendor's identity associated with a transaction may be determined automatically, even if a large number of receipts are gathered. As such, appropriate tax rules associated with the vendor's identity may be readily applied. Additionally, such determination of the vendor's identity may be used to complete manually entered vendor identity information, and in the case where the vendor's identity has not been entered, serve as a substitute. Therefore, determination of the vendor's identity may be streamlined.

Figure 6:
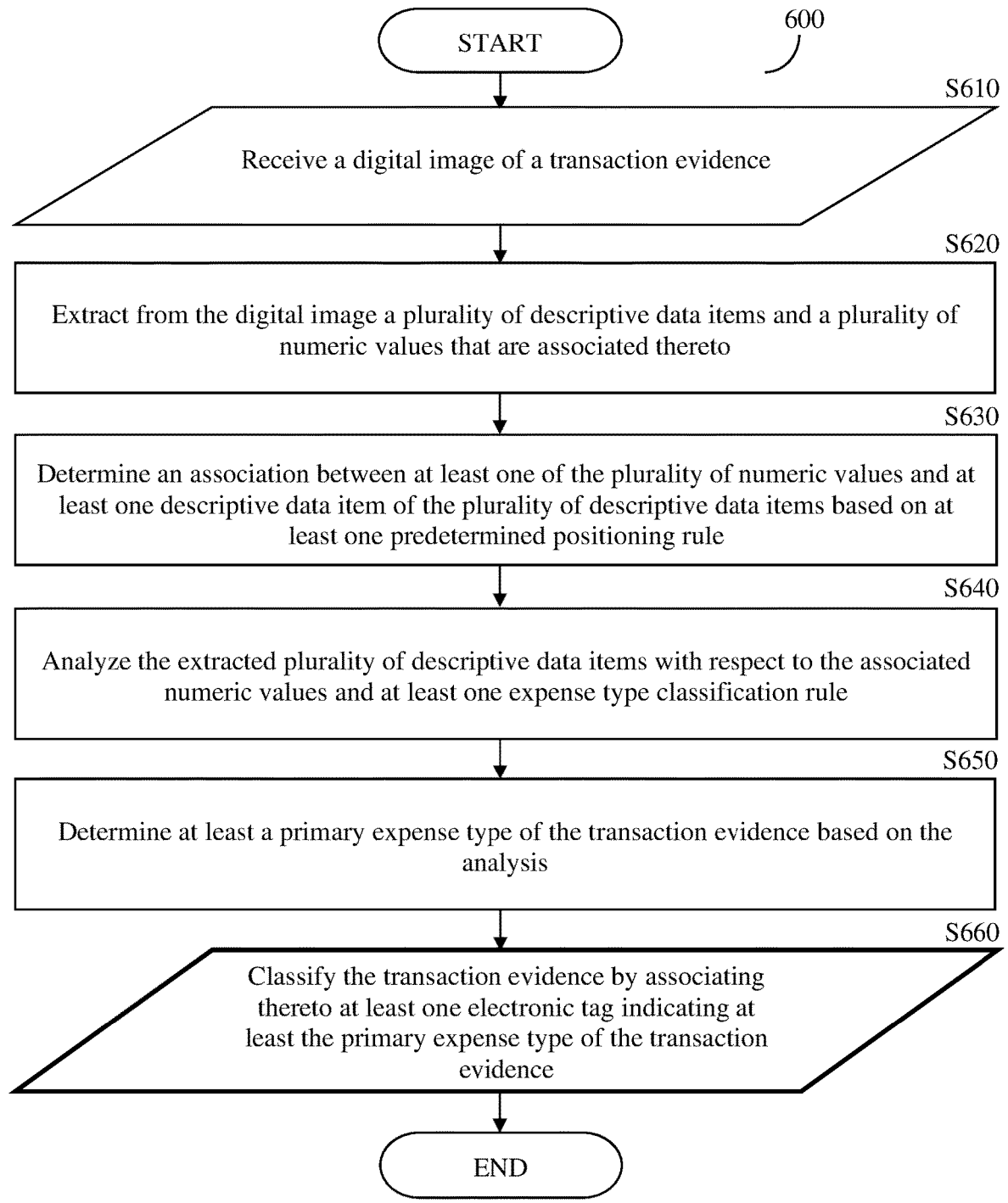
FIG. 6 is a flowchart illustrating a method for automatically classifying digital images of transaction evidences according to an embodiment.

FIG. 6 is an example flowchart 600 illustrating a method for automatically classifying digital images of transaction evidences according to an embodiment. In an embodiment, the method may be performed by the computing device 120.

At S610, a digital image of a transaction evidence is received. The digital image may be received from a user device, such as a smartphone (not shown), from a server, and so on. In an embodiment, the image may be extracted from a data warehouse, such as the transaction evidence repository 130 that may include a plurality of images. Such images may include, but is not limited to, evidentiary electronic documents including information related to transactions. The evidentiary electronic documents may include, but are not limited to, invoices, receipts, and the like.

At S620, a plurality of descriptive data items and a plurality of numeric values that are associated thereto are extracted from the image of the transaction evidence. The descriptive data items may be words, symbols, and the like, that are indicative of a related expense type, and the plurality of numeric values represents the amounts paid for each expense item that is represented by the plurality of descriptive data items. The extraction may be achieved using the OCR technique. The extraction may include conversion of image to text.

At S630, an association between at least one of the plurality of numeric values and at least one descriptive data item of the plurality of descriptive data items, is determined. The determination may be achieved based on at least one predetermined positioning rule. The positioning rule relates to the position of at least one descriptive data item in relation to at least one numeric value as further described herein below.

At S640, the extracted descriptive data items are analyzed with respect to the associated numeric values and at least one expense type classification rule. An expense type classification rule may be indicative of a primary expense type and at least a secondary expense type. For example, the expense type classification rule may state that the descriptive data item that is associated with the highest numeric value in comparison to the other numeric values of the transaction evidence, is the primary expense type and all the other represent secondary expense types. The expense type classification rule may be selected from a plurality of expense type classification rules that may be stored in a database, a web source, a cloud database, and so on.

In an embodiment, the selection of the expense type classification rule may be achieved by determining, based on extraction and analysis of data and metadata associated with the image of the transaction evidence, at least a country parameter. The country parameter is a data item that indicates to which country or countries the vendor and the consumer are related. The data may include for example, the vendor address, vendor name, etc. The metadata may relate to information that does not exist in the image of the transaction evidence, such as a specific legal entity and/or the address of, for example, a subsidiary to which the transaction evidence is related.

By determining the country parameter one or more data sources such as a database, a web source, a cloud database, etc. can be searched for a relevant expense type classification rule. That is, different countries may apply different tax rules and different requirements. Thus, while in a first country the expense type classification rule states that the highest amount is indicative of the primary expense type, in a second country other rules may apply indicating otherwise.

In an embodiment, the VAT classification is determined for at least the primary expense type based on the one or more relevant tax regulations that were extracted based on the identified country parameter.

The analysis may further include comparison of the extracted descriptive data items to a plurality of previously analyzed and tagged descriptive data items that is associated with at least one previously analyzed and previously tagged transaction evidence. The comparison allows to determine the expense type of the transaction evidence based on previous cases, previous transaction evidences, that were previously analyzed, tagged and classified as related to a certain type of expense.

At S650, at least a primary expense type of the transaction evidence is determined based on the analysis. It should be noted that one or more secondary expense types may be determined.

At S660, the transaction evidence is classified based on the determination of the primary expense type. The classification may be achieved by generating an electronic tag and associate the electronic tag to the image of the transaction evidence. The electronic tag may be indicative of at least the primary expense type of the transaction evidence. The classification may further include sending the image of the analyzed transaction evidence to a data warehouse, a specific server, electronic folder, designated database, cloud database, etc. based on at least the determined primary expense type.

With the method described above, classification of transaction evidence may be made automatically, which would streamline both the time and minimize labor required to process the information, even when the volume of information is large. Also, with the classification, different tax rules may be applied appropriately towards the transactions.

Figure 7:
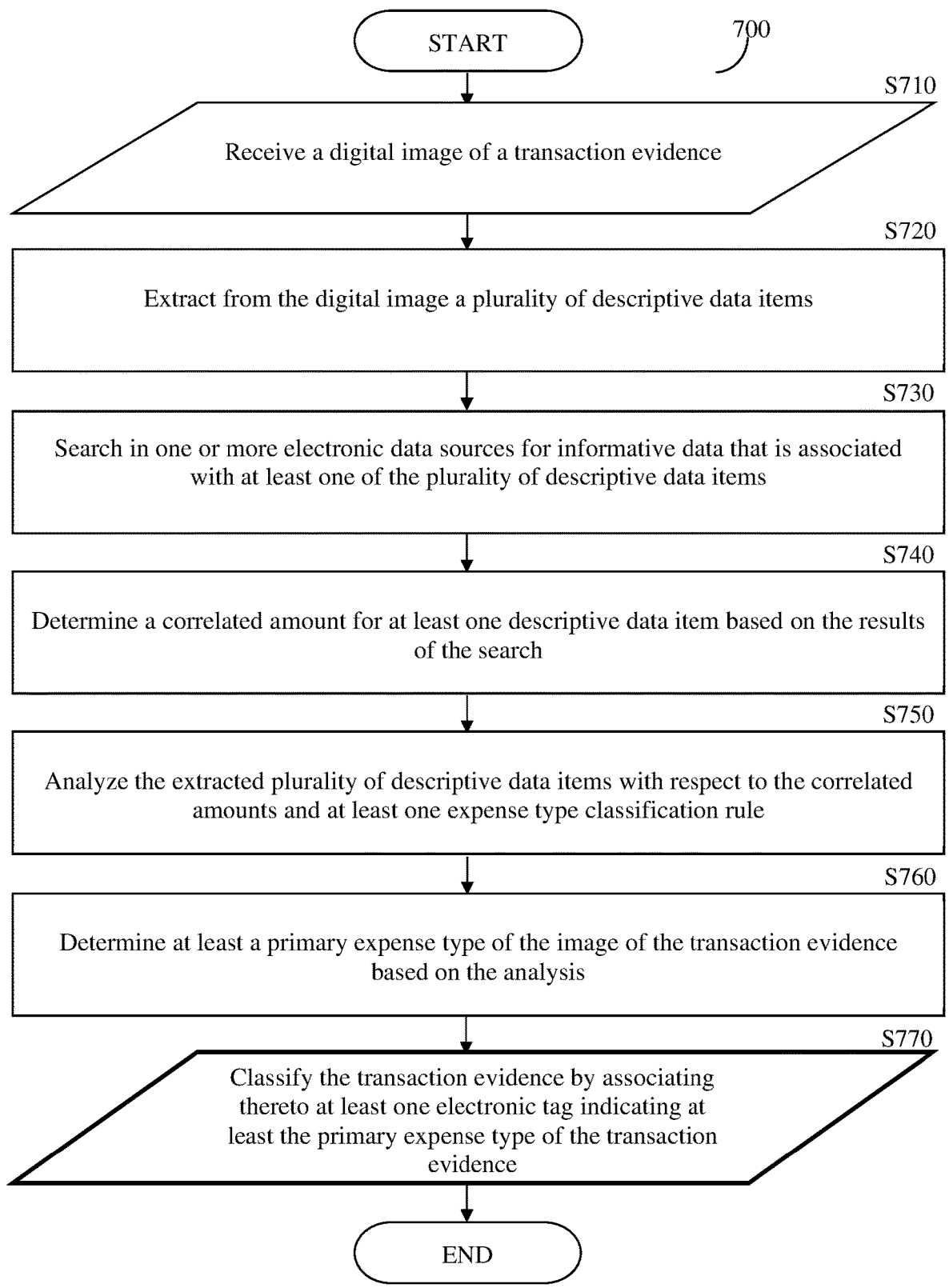
FIG. 7 is a flowchart illustrating a method for automatically classifying digital images of transaction evidences based on a primary expense type, according to an embodiment.

FIG. 7 is an example flowchart 700 illustrating a method for automatically classifying digital images of transaction evidences based on a primary expense type according to an embodiment. In an embodiment, the method may be performed by the computing device 120.

At S710, a digital image of a transaction evidence is received. The digital image may be received from a user device such as a smartphone (not shown), from a server, and so on. In an embodiment, the image may be extracted from a data warehouse, such as, the transaction evidence repository (e.g., the repository 130, FIG. 1) that may include a plurality of images. Such images may include, but is not limited to, evidentiary electronic documents including information related to transactions. The evidentiary electronic documents may include, but are not limited to, invoices, receipts, and the like.

At S720, a plurality of descriptive data items is extracted from the image of the transaction evidence. The plurality of descriptive data items is associated with a plurality of items that were previously purchased. The descriptive data items may be words, symbols, etc. that are indicative of a related expense type, and the numeric value represents the total amount paid for all the items exist in the transaction evidence, in general. The extraction may be achieved using OCR technique. The extraction may include conversion of image to text. In an embodiment, a numeric value that represents a transaction total amount may also be extracted and be utilized to determine the primary expense type.

At S730, a search is performed, based on the extracted descriptive data items, in one or more electronic data sources for informative data that is associated with at least one of the plurality of items. The informative data may include for example, at least one of a price estimation of at least one item of the plurality of items, an average price, an exact price, and the like.

At S740, based on the result of the search, at least a correlated amount is determined for at least one of the plurality of descriptive data items. The correlated amount reflects the price paid for the item associated with the descriptive data item.

At S750, the extracted plurality of descriptive data items is analyzed with respect to the correlated amounts and at least one expense type classification rule. The at least one expense type classification rule is indicative of at least a primary expense type as further described herein above.

At S760, at least a primary expense type of the transaction evidence is determined based on the analysis. It should be noted that one or more secondary expense types may be determined.

At S770, the transaction evidence is classified based on the determination of the primary expense type. The classification may be achieved by generating an electronic tag and associate the electronic tag to the image of the transaction evidence. The electronic tag may be indicative of at least the primary expense type of the transaction evidence. The classification may further include sending the image of the analyzed transaction evidence to a data warehouse, a specific server, electronic folder, designated database, cloud database, etc. based on at least the determined primary expense type.

With the method described above, classification of the type of expense associated with a transaction may be made automatically, which would streamline both the time and minimize labor required to process the information, even when the volume of information is large. Also, with the classification, different tax rules may be applied appropriately towards the expense by which the transaction is made.

Figure 8:
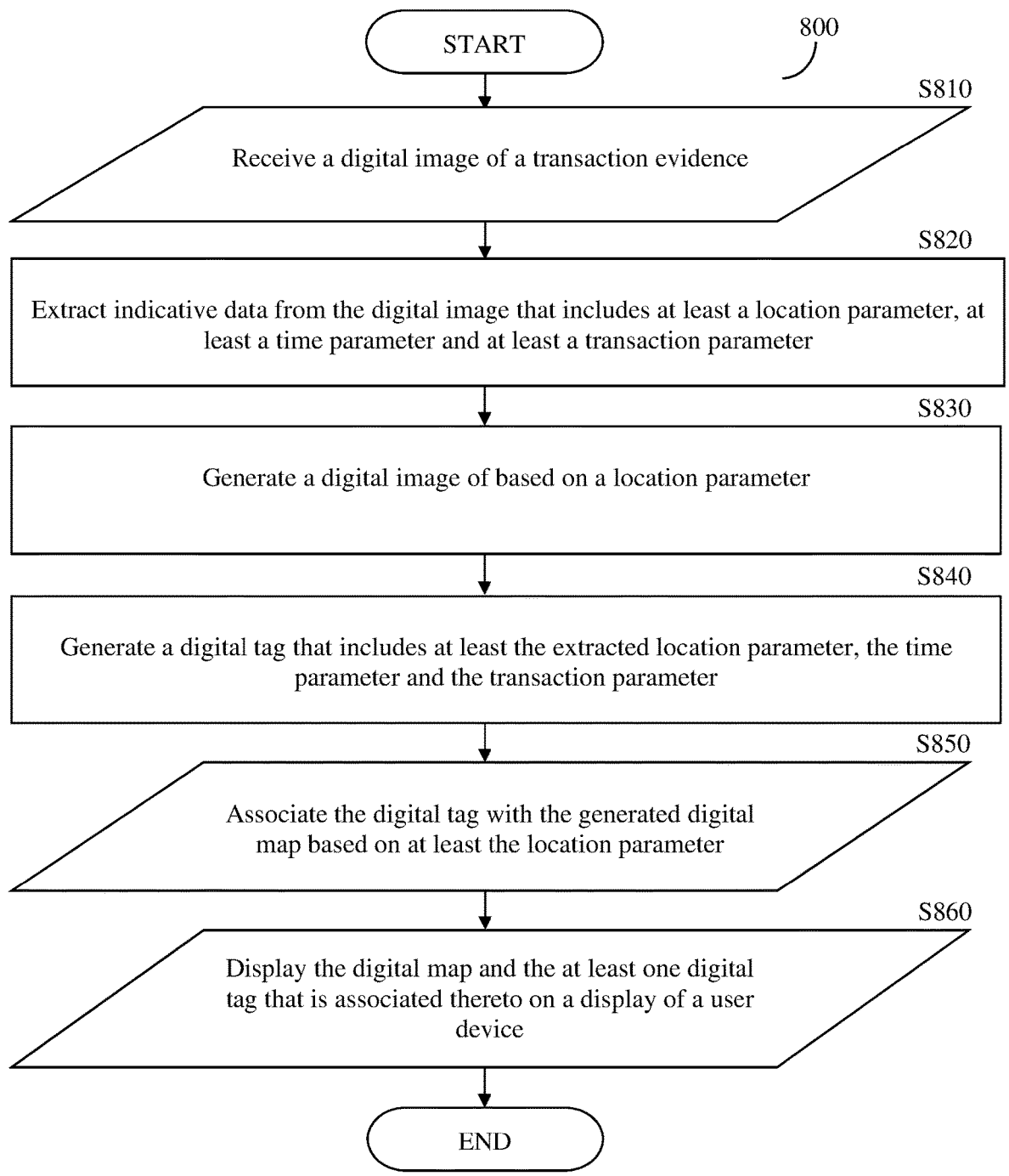
FIG. 8 is a flowchart illustrating a method for generating a digital map based on one or more processed digital images of transaction evidences according to an embodiment.

FIG. 8 is an example flowchart 800 illustrating a method for generating a digital map based on one or more processed digital images of transaction evidences according to an embodiment. In an embodiment, the method may be performed by the computing device 120.

At S810, a digital image of a transaction evidence is received. The digital image may be received from a user device, from a server, and so on. In an embodiment, the image may be extracted from a data warehouse, such as, the transaction evidence repository (e.g., the repository 130, FIG. 1) that may include a plurality of digital images. Such digital images may include, but is not limited to, evidentiary electronic documents including information related to transactions. The evidentiary electronic documents may include, but are not limited to, invoices, receipts, and the like.

At S820, data that is indicative of at least a location parameter, at least a time parameter and at least a transaction parameter that are associated with the transaction evidence is extracted from the digital image of the transaction evidence. A location parameter is a data item indicating, for example, the address of a vendor's branch from which services or goods were purchased, the location at which a tax receipt was issued, and the like. A time parameter is a data item indicating, for example, the day, exact time, etc. where the transaction occurred. A transaction parameter may include the transaction amount, the service and/or products description, and so on. The extraction may be achieved using, for example, OCR or other computer vision techniques. The extraction may include conversion of image to text.

At S830, a digital map is generated based on the extracted at least one location parameter. The generation of the digital map may include selecting from a plurality of digital map templates an appropriate map based on the extracted location parameter.

At S840, at least one digital tag that includes at least the extracted location parameter, the time parameter and the transaction parameter, is generated. The digital tag is a visual representation of the aggregated data items associated with a certain transaction, or more than one transaction.

At S850, the at least one generated digital tag is associated with the generated digital map based on at least the location parameter. That is, the generated digital tag is positioned at the appropriate position within the digital map which may reflect, for example, the location of the vendor's address.

At optional S860, the digital map and the at least one digital tag that is associated thereto are displayed on a display of a user device.

With the method described above, by processing a digital image of a transaction evidence, a digital map is generated based on the location parameter, and inappropriate reporting events of expenses made by employees, and inappropriate reporting patterns may be automatically detected more quickly and easily, even when the volume of information is large. Also, analysis of expense data to detect inappropriate behavior may be made more efficiently.

Figure 9:
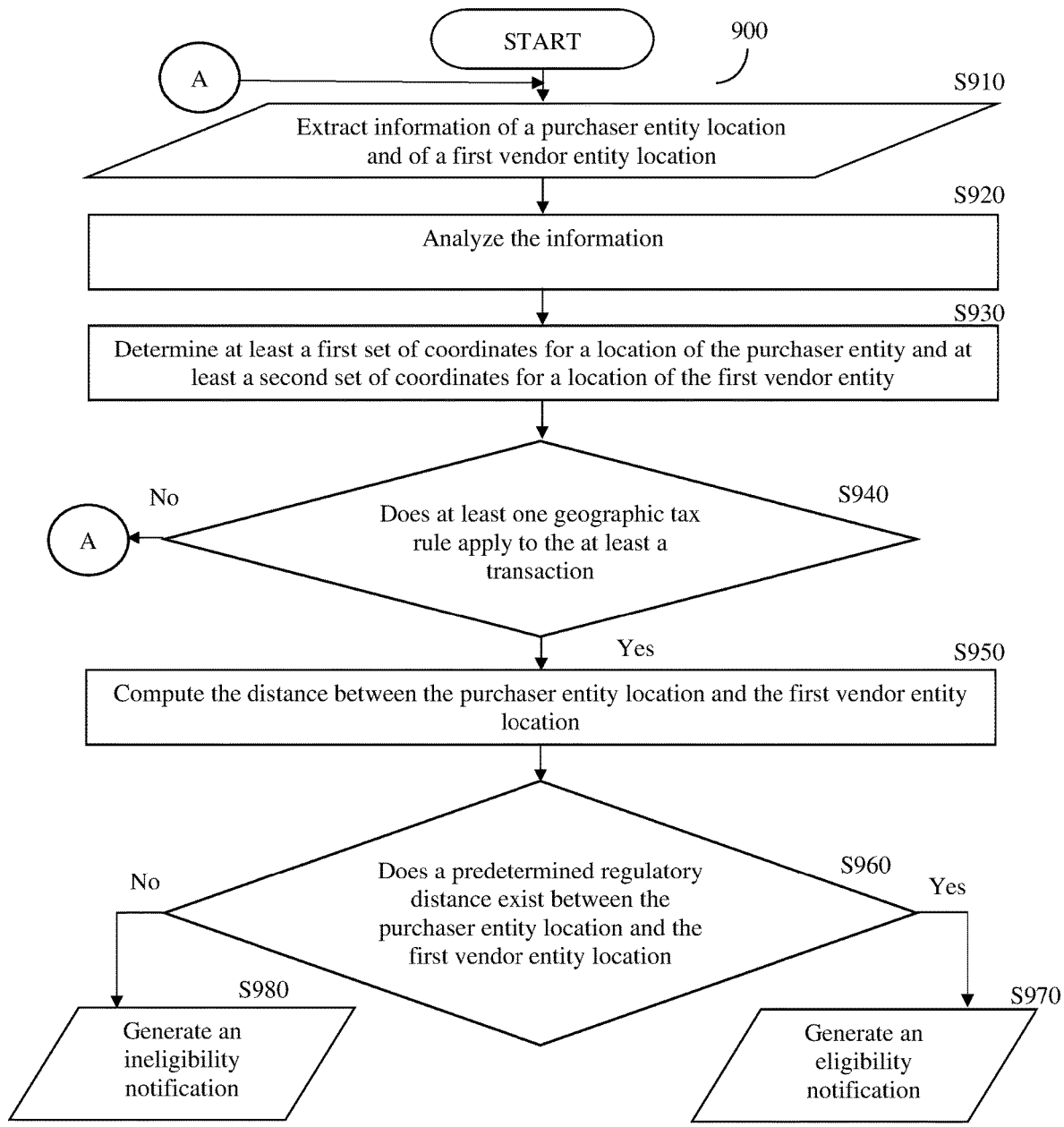
FIG. 9 is a flowchart illustrating a method for determining eligibility of transactions for tax reclaim based on geographic location according to an embodiment.

FIG. 9 is an example flowchart 900 illustrating a method for determining eligibility of transactions for tax reclaim based on geographic location according to an embodiment. In an embodiment, the method may be performed by the computing device 120 shown in FIG. 1.

At S910, information of a purchaser entity location and of a first vendor entity location is extracted from a transactional electronic document. A transactional electronic document may be a record of a transaction, or a future transaction, between two parties that is stored in an enterprise resource planning (ERP) system, a database, a cloud database, within a digital image of an invoice or a receipt, booking management system, etc.

In an embodiment, one or more datasets may be created based on the transactional electronic document that includes at least partially unstructured data. Data may be at least partially unstructured if it is or includes unstructured data, semi-structured data, structured data having an unknown structure, or a combination thereof. To this end, an optical character recognition (OCR) technique, or other image processing, may be utilized to determine data in the transactional electronic document, or in other electronic documents, such as for example, expense reports. In an embodiment, the created datasets may be analyzed and therefore allow identification of informative data items. Informative data items may be for example, a name of a vendor, a logo, etc. that can be further utilized for determining coordinates of location at which the purchaser and or vendor are registered for tax purposes.

At S920, the extracted information is analyzed. The analysis may include, for example, searching using the extracted information in one or more data sources for coordinates of a location at which each of the purchaser entity is registered for tax purposes and a location at which the vendor entity is registered for tax purposes. For example, using an extracted name or address of a vendor, the accurate coordinates that allow calculation of the exact location of the vendor, may be extracted. The analysis may further include comparing the extracted information to one or more previous information that was gathered with respect to the same vendor and/or the same purchaser for determining the coordinates related thereto.

At S930, at least a first set of coordinates for a location of the purchaser entity and at least a second set of coordinates for a location of the first vendor entity is determined based on the analyzed information. The purchaser entity location is registered for tax purposes for the purchaser entity and the first vendor entity location is registered for tax purposes for the first vendor entity. A geographic coordinate enables every location on earth to be specified by a set of numbers, letters or symbols. The coordinates are often chosen such that one of the numbers represents a vertical position and two or three of the numbers represent a horizontal position. Using the coordinates of two, or more, locations the distance between them can be computed accurately and rapidly. The first and the second set of coordinates may be determined based on searching in one or more sources for the coordinates based on the analyzed information.

At S940, it is determined whether at least one geographic tax rule applies to the at least a transaction and if so, execution continues with S950, otherwise; execution continues with S910. The at least one geographic tax rule pertains to distance eligibility for a tax reclaim. A geographic tax rule is a regulatory requirement of tax authority of a certain country that applies in certain circumstances. For example, when a purchaser entity that is registered for tax purposes in Mexico, books a future service from a vendor entity, e.g., a car rental agency, that is registered for tax purposes also in Mexico, in a location that is distant from the purchaser in less than 50 miles, the transaction may not be deductible and the VAT of the transaction may not be reclaimed. However, according to the same example, if the distance between the parties is more than 50 miles, the transaction may be eligible for VAT recovery. It should be noted that, the computing of the distance between the purchaser entity location and the vendor entity location is achieved using the first set of coordinates and the second set of coordinates.

At S950, the distance between the purchaser entity location and the first vendor entity location is computed.

At S960, it is checked whether a predetermined regulatory distance exists between the purchaser entity location and the first vendor entity location and if so, execution continues with S970, otherwise; execution continues with S980.

At S970, an eligibility notification is generated upon determination that the predetermined regulatory distance exists between the purchaser entity location and the first vendor entity location. An eligibility notification may be an electronic message that is sent to, for example, a user device that is associated with the purchaser entity. The eligibility notification may indicate that the transaction is eligible for VAT recovery, that the transaction is tax-deductible, etc.

At S980, an ineligibility notification is generated upon determination that the predetermined regulatory distance does not exist between the purchaser entity location and the first vendor entity location. The ineligibility notification may indicate that the transaction is ineligible for VAT recovery, that the transaction is not tax-deductible, etc.

With the above method as described, inappropriate reporting events of expenses made by employees and companies, and inappropriate reporting patterns that do not comply with company's policy and/or tax rules may be automatically detected more quickly and easily, even when the volume of information is large. Also, with the above method, transactions that are ineligible for VAT reclaim may be automatically detected even in advance, therefore allowing to change the vendor entity identity such that VAT can be reclaimed, and tax can be deducted.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more Central Processing Units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination. All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for determining vendor identity based on electronic documents analysis, comprising:
   receiving a first electronic document having a plurality of textual items;
   extracting at least a first sequence of textual items from the plurality of textual items;
   determining a first approximate identity of a vendor entity that issued the first electronic document by comparing the first sequence of textual items to at least a second sequence of textual items that is associated with at least a second electronic document that was previously associated with a unique vendor entity;
   extracting a first multiset of textual items from the plurality of textual items of the first electronic document;
   determining a second approximate identity of a vendor entity that issued the first electronic document by comparing the first multiset of textual items to at least a second multiset of textual items that was previously associated with the unique vendor entity; and
   determining a specific identity of the vendor entity that issued the first electronic document upon determination that the first approximate identity and the second approximate identity are identical, otherwise performing a resolution process.

2. The method of claim 1, wherein determination the first approximate identity of the vendor entity further comprises:
   performing a first comparison between the first sequence of textual items of the first electronic document and the at least a second sequence of textual items of a plurality of second electronic documents;
   generating, based on the first comparison, for each of the at least a second sequence of textual items of the plurality of second electronic documents, a sequence matching score with respect to each of the at least a first sequence of textual items;
   searching, based on each of the generated sequence matching scores, for at least a second electronic document of the plurality of second electronic documents, having a sequence matching score that is above a first predetermined threshold, wherein the at least a second electronic document is previously associated with the unique vendor entity; and,
   determining the first approximate identity of the vendor entity that issued the first electronic document based on the previously associated identity of the unique vendor entity that issued the at least a second electronic document.

3. The method of claim 2, wherein the first comparison further comprises:
   comparing a first set of characteristics of the at least a first sequence to at least a second set of characteristics of the at least a second sequence of textual items of the plurality of second electronic documents.

4. The method of claim 1, wherein determining the second approximate identity further comprises:

performing a second comparison between the at least a first multiset of textual items and the at least a second multiset of textual items that was previously associated with a unique vendor entity;
generating, based on the second comparison, a textual items' matching score for each of the at least a first multiset of textual items with respect to each of the at least a second multiset of textual items;
searching, based on the generated textual items' matching scores, for at least a second multiset of textual items that is associated with the unique vendor entity having a textual items' matching score that is above a second predetermined threshold; and
determining a second approximate identity of the vendor entity that issued the first electronic document based on a predetermined identity of the unique vendor entity to which the second multiset of textual items is associated with.

5. The method of claim 4, wherein generating the textual items' matching score further comprises:
calculating a frequency level of at least a portion of the first multiset of textual items, at the at least a second multiset of textual items.

6. The method of claim 1, further comprising:
associating the determined specific identity of the vendor entity that issued the first electronic document with the first electronic document.

7. The method of claim 1, further comprising:
generating a multidimensional graph that indicates an association level between the first electronic document and the second electronic document.

8. The method of claim 1, wherein the electronic document is a transaction evidence.

9. A non-transitory computer readable medium having stored thereon instructions for causing a processing circuitry to execute a process for determining vendor identity based on electronic documents analysis, the process comprising:
receiving a first electronic document having a plurality of textual items;
extracting at least a first sequence of textual items from the plurality of textual items;
determining a first approximate identity of a vendor entity that issued the first electronic document by comparing the first sequence of textual items to at least a second sequence of textual items that is associated with at least a second electronic document that was previously associated with a unique vendor entity;
extracting a first multiset of textual items from the plurality of textual items of the first electronic document;
determining a second approximate identity of a vendor entity that issued the first electronic document by comparing the first multiset of textual items to at least a second multiset of textual items that was previously associated with the unique vendor entity; and
determining a specific identity of the vendor entity that issued the first electronic document upon determination that the first approximate identity and the second approximate identity are identical, otherwise performing a resolution process.

10. A system for determining vendor identity based on electronic documents analysis, comprising:
a processing circuitry; and
a memory, the memory containing instructions that, when executed by the processing circuitry, configure the system to:
receive a first electronic document having a plurality of textual items;
extract at least a first sequence of textual items from the plurality of textual items;
determine a first approximate identity of a vendor entity that issued the first electronic document by comparing the first sequence of textual items to at least a second sequence of textual items that is associated with at least a second electronic document that was previously associated with a unique vendor entity;
extract a first multiset of textual items from the plurality of textual items of the first electronic document;
determine a second approximate identity of a vendor entity that issued the first electronic document by comparing the first multiset of textual items to at least a second multiset of textual items that was previously associated with the unique vendor entity; and
determine a specific identity of the vendor entity that issued the first electronic document upon determination that the first approximate identity and the second approximate identity are identical, otherwise performing a resolution process.

11. The system of claim 10, wherein the system is further configured to:
perform a first comparison between the first sequence of textual items of the first electronic document and the at least a second sequence of textual items of a plurality of second electronic documents,
generate, based on the first comparison, for each of the at least a second sequence of textual items of the plurality of second electronic documents, a sequence matching score with respect to each of the at least a first sequence of textual items;
search, based on each of the generated sequence matching scores, for at least a second electronic document of the plurality of second electronic documents, having a sequence matching score that is above a first predetermined threshold, wherein the at least a second electronic document is previously associated with the unique vendor entity; and
determine the first approximate identity of the vendor entity that issued the first electronic document based on the previously associated identity of the unique vendor entity that issued the at least a second electronic document.

12. The system of claim 11, wherein the first comparison further comprises:
compare a first set of characteristics of the at least a first sequence to at least a second set of characteristics of the at least a second sequence of textual items of the plurality of second electronic documents.

13. The system of claim 10, wherein the system is further configured to:
perform a second comparison between the at least a first multiset of textual items and the at least a second multiset of textual items that was previously associated with a unique vendor entity;
generate, based on the second comparison, a textual items' matching score for each of the at least a first multiset of textual items with respect to each of the at least a second multiset of textual items;
search, based on the generated textual items' matching scores, for at least a second multiset of textual items that is associated with the unique vendor entity, and that have a textual items' matching score that is above a second predetermined threshold; and
determine a second approximate identity of the vendor entity that issued the first electronic document based on a predetermined identity of the unique vendor entity to which the second multiset of textual items is associated with.

14. The system of claim 10, wherein the system is further configured to:
associate the determined specific identity of the vendor entity that issued the first electronic document with the first electronic document.

15. The system of claim 10, wherein the system is further configured to:
calculate a frequency level of at least a portion of the first multiset of textual items, at the at least a second multiset of textual items.

16. The system of claim 10, wherein the system is further configured to:
generate a multidimensional graph that indicates an association level between the first electronic document and the second electronic document.

17. The system of claim 10, wherein the electronic document is a transaction evidence.

* * * * *